US009208350B2

(12) United States Patent
Sabin et al.

(10) Patent No.: US 9,208,350 B2
(45) Date of Patent: Dec. 8, 2015

(54) CERTIFICATE INFORMATION VERIFICATION SYSTEM

(71) Applicants: Jason Allen Sabin, Lehi, UT (US); Richard Jeremy Rowley, Pleasant Grove, UT (US)

(72) Inventors: Jason Allen Sabin, Lehi, UT (US); Richard Jeremy Rowley, Pleasant Grove, UT (US)

( * ) Notice: Subject to any disclaimer, the term of this patent is extended or adjusted under 35 U.S.C. 154(b) by 0 days.

(21) Appl. No.: 13/737,451

(22) Filed: Jan. 9, 2013

(65) Prior Publication Data

US 2014/0195800 A1  Jul. 10, 2014

(51) Int. Cl.
  *G06F 21/64* (2013.01)
  *H04L 9/32* (2006.01)
  *H04L 29/06* (2006.01)

(52) U.S. Cl.
  CPC .............. *G06F 21/64* (2013.01); *H04L 9/3268* (2013.01); *G06F 21/645* (2013.01); *H04L 63/10* (2013.01)

(58) Field of Classification Search
  CPC ..... G06F 21/64; G06F 21/645; H04L 9/3263; H04L 9/3268; H04N 21/835
  USPC ......................................................... 713/156
  See application file for complete search history.

(56) References Cited

U.S. PATENT DOCUMENTS

| 7,769,690 | B2 * | 8/2010 | Dare et al. ....................... 705/50 |
| 2005/0038991 | A1 * | 2/2005 | Brown et al. .................. 713/156 |
| 2010/0250948 | A1 * | 9/2010 | Little et al. ..................... 713/175 |
| 2011/0213961 | A1 * | 9/2011 | Wnuk et al. ................... 713/156 |
| 2011/0213966 | A1 * | 9/2011 | Fu et al. ......................... 713/158 |
| 2012/0311323 | A1 * | 12/2012 | Brown et al. .................. 713/158 |

OTHER PUBLICATIONS

Emura et al, Secure and Anonymous Communication Technique: Formal Model and its Prototype Implementation, IEEE, Year: 2015, vol. PP, Issue: 99,pp. 1-1.*
Hess et al, An Access Control Model for Dynamic Client-Side Content, ACM digital library, 2003, Proceedings of the eighth ACM symposium on Access control models and technologies, pp. 207-216.*

* cited by examiner

*Primary Examiner* — Hadi Armouche
*Assistant Examiner* — Ali Shayanfar
(74) *Attorney, Agent, or Firm* — Rasmussen Shapiro, PLLC

(57) ABSTRACT

The invention discloses a system and apparatus for detecting problematic certificate action requests and digital certificates. Ideally, the invention will be used to detect a certificate request that will result in security problems and detect issued certificates that lack essential information. The invention uses a proxy system that intercepts certificate requests and transmitted certificates. The proxy system runs a series of checks on the intercepted request and/or certificate. The checks vary depending on the certificate contents, requester, and system providing the request or certificate.

20 Claims, 3 Drawing Sheets

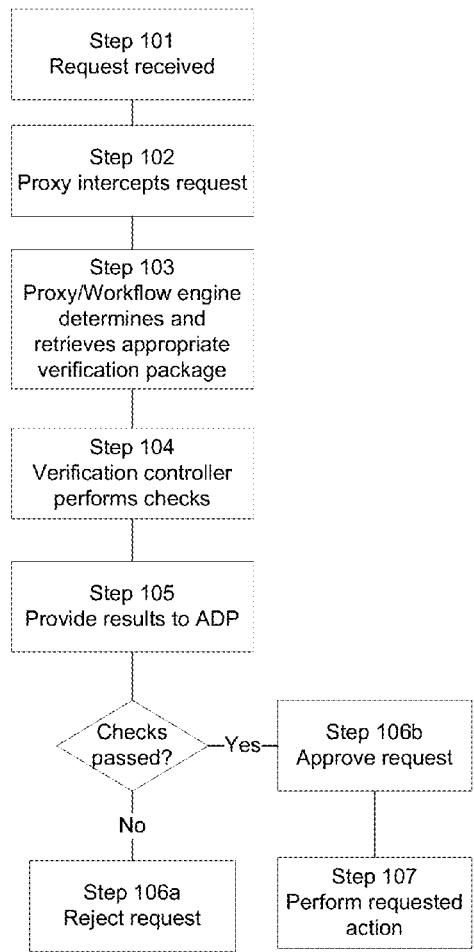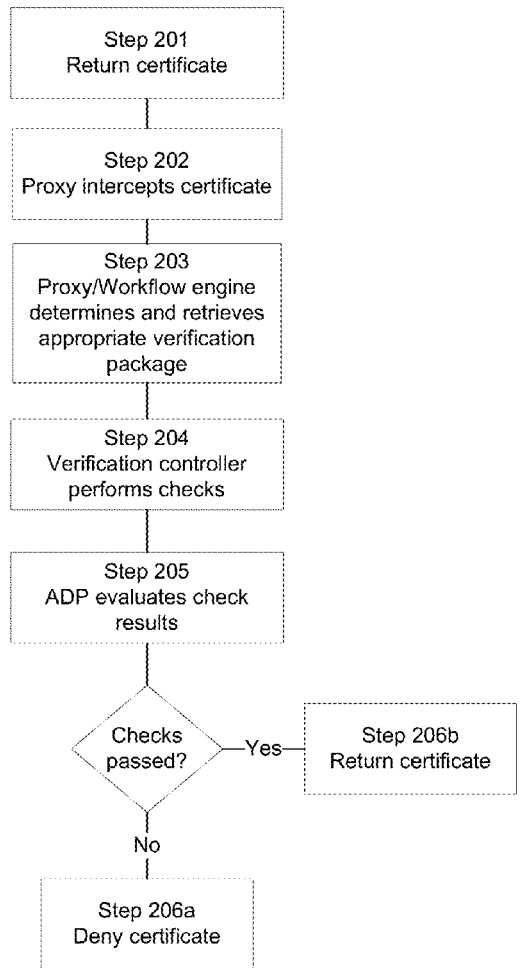
Fig. 1
Fig. 2

CERTIFICATE INFORMATION VERIFICATION SYSTEM

BACKGROUND

Certification Authorities are publicly trusted entities that are authorized by application software providers to issue digital certificates for use in conducting secured transactions. The Internet's security relies heavily on the proper and secure operation of these entities. A single mis-issued certificate can cause mistrust in the entire Internet infrastructure and result in a decrease in online transactions. For example, a bad actor obtaining a certificate with an unverified domain name can perform a man-in-the-middle attack to steal credit card data. If the certificate lacks revocation information, the certificate becomes a permanent fixture on the Internet and cannot be deactivated if the certificate is misused.

Certificate Authorities (CAs) protect digital certificate creation systems by keeping their internal CA systems and processes confidential and secret. Unfortunately, this lack of public scrutiny makes detection of problematic certificates issuance very difficult. A CA may issue certificates without appropriate fields by mistake, through the ignorance of a well-intentioned customer representative, or through the actions of a rogue developer. Any mis-issued certificate may remain undetected for a long period of time, giving attackers repeated opportunities to abuse the CA's mistake.

To prevent these problems, the industry needs a system to check and verify the certificate's issuance and contents. The industry needs a safeguard that prevents mistakes from occurring, that promptly detects mis-issued certificates, and that can determine when problems result from a malicious actor instead of an innocent mistake.

SUMMARY OF THE INVENTION

The invention discloses a system and apparatus for detecting malformed certificate action requests and problematic digital certificates. Ideally, the invention will be used to detect certificate requests that could result in security problems and detect issued certificates that lack essential information.

The invention uses a proxy system to intercept certificate requests and transmitted certificates. The proxy system uses a workflow engine to run a series of checks on the intercepted request and/or certificate. The checks vary depending on the certificate contents, requester, and system providing the request or certificate.

If an evaluated certificate request or certificate fails the checks, the system may deny the request and provide a warning to systems and stakeholders designated as responsible for evaluating problems. The system may also return an error to the requester or certificate service system. In an alternate embodiment, the system transparently monitors the requests and provides notice to stakeholders.

All of the information generated or used by the system to perform the check and evaluate the request or certificate is logged for audit purposes. The log files are associated with the request/certificate so auditors can easily review the entire certificate ordering process.

Ideally, the entire proxy system is separate from the certificate service system to ensure that changes to the certificate service system do not impact the proxy system. Additionally, the proxy system should not modify certificates or request. The proxy systems role is to evaluate and report system performance, not make modifications to system operations.

For compliance and auditability, the audit events from the requester and certificate services systems can be correlated with the audit events of the proxy service. Correlating the audit events holds each of the three systems (the requester, proxy system, and certificate services system accountable to the other systems.

BRIEF DESCRIPTION OF THE FIGURES

FIG. 1 is a flowchart of a proxy system designed to intercept and evaluate certificate requests.

FIG. 2 is a flowchart of a proxy system designed to intercept and evaluate certificates.

DESCRIPTION OF INVENTION

Figure 3:
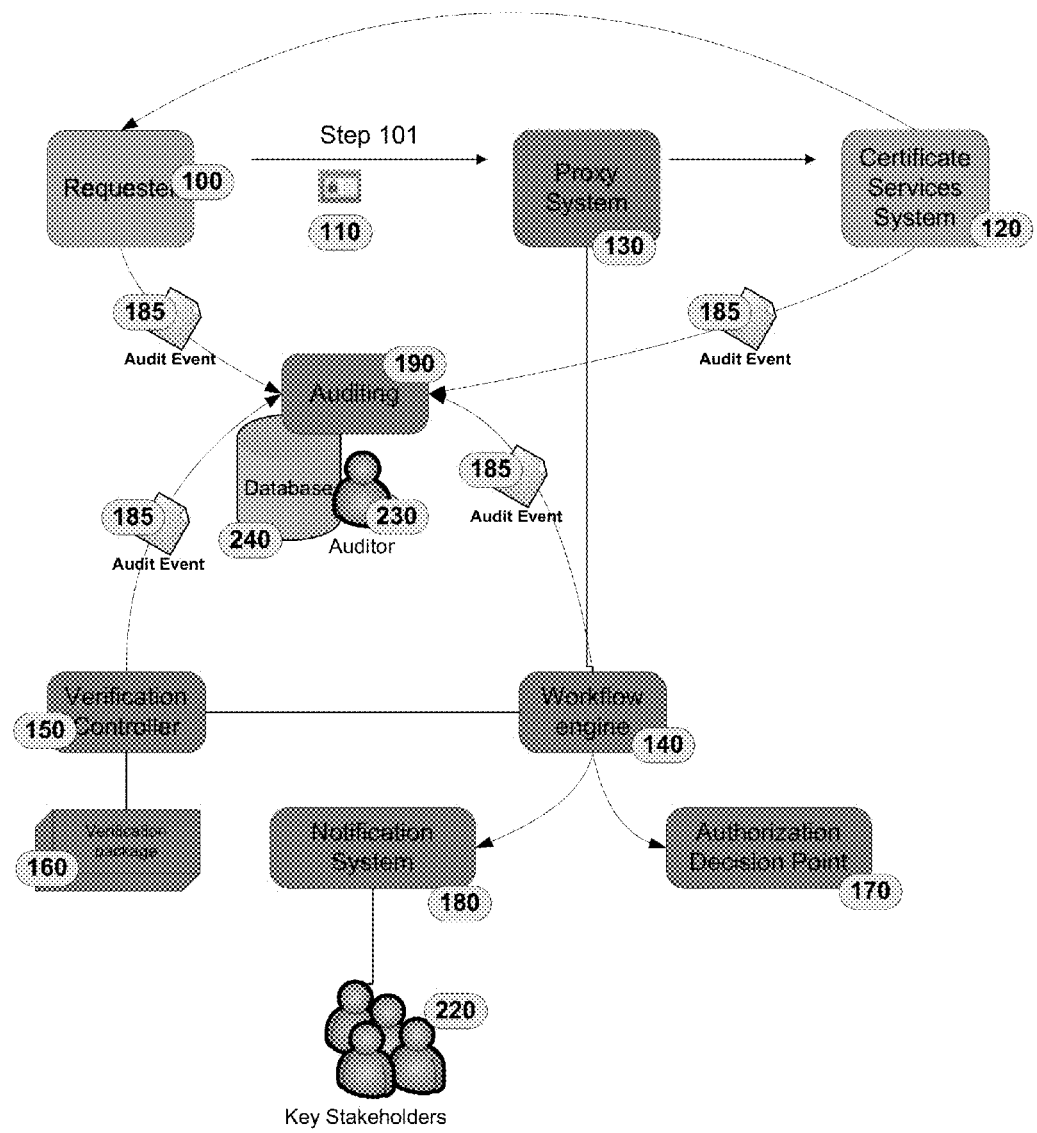
FIG. 3 is a depiction of the system used to achieve the proxy system described in FIG. 1.
Figure 4:
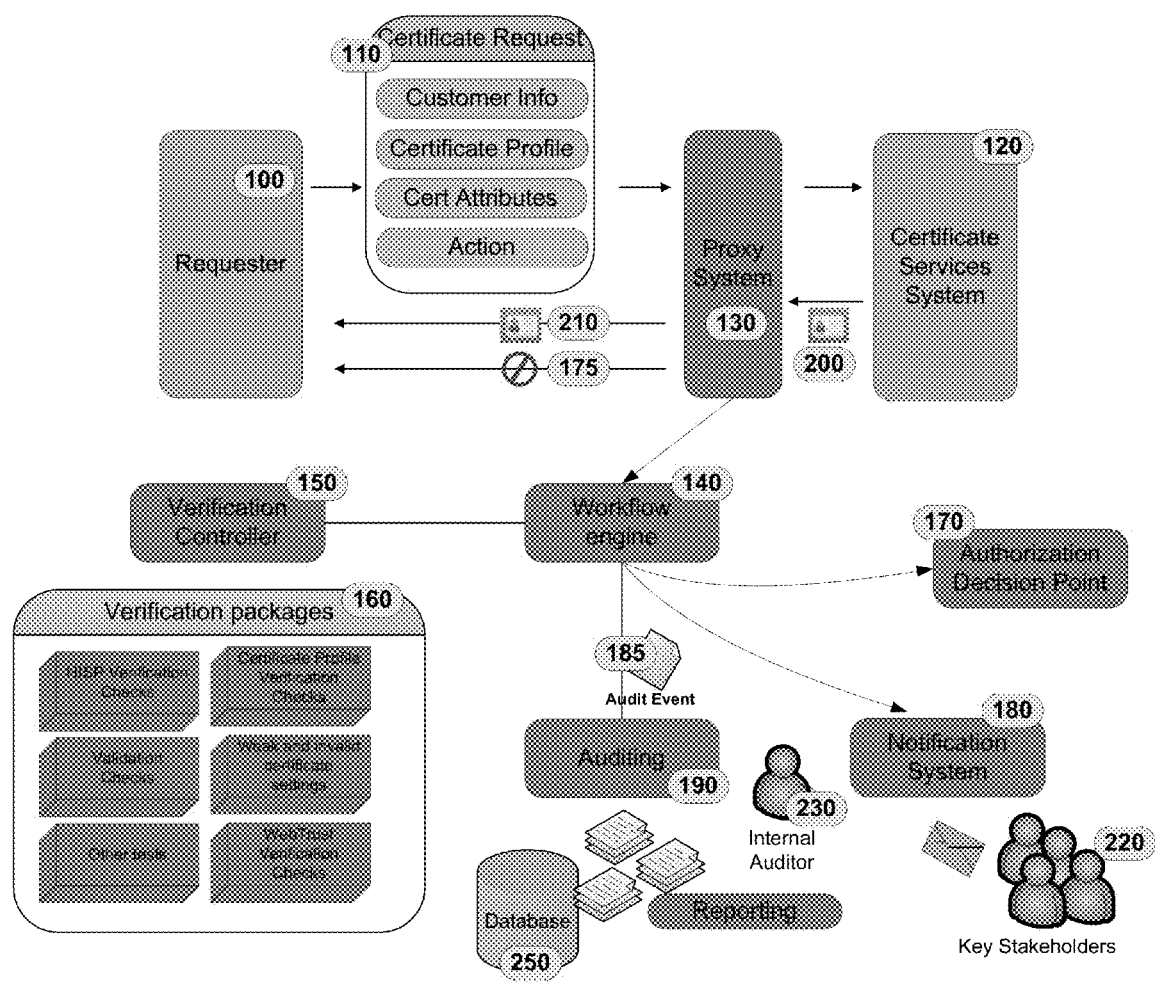
FIG. 4 is an alternate embodiment of the proxy system and shows a system designed to evaluate both certificate requests and certificates.

The invention discloses a method of validating the proper performance of certificate service systems using a proxy service or web service. The proxy service interacts with the certificate request system 100 and certificate service systems 120 to ensure that certificate requests and resulting certificates meet set criteria before being distributed for use in a production environment. The figures are for the purpose of illustrating the invention and preferred embodiment. However, the invention is not limited to the specific implementations shown in the figures as several of the steps and components are optional or intended only to increase security of the overall system.

Each of the components described herein may refer to a software package, virtual appliance, system, or other apparatus or process that can perform the described function. The invention envisions separate components or systems for the proxy, workflow engine, verification controller, and other systems, but all of the systems could be part of one or more components or systems that fulfils the system's assigned function.

In Step 101 of FIG. 1, a certificate request (or request) 110 is sent to a certificate services system 120. A certificate request may include a request to create a certificate, retrieve an existing certificate, modify an existing certificate, or some similar certificate-related action. A certificate services system may include a certificate issuance system that provides issued certificates, a certificate management that provides remote signing services, or a certificate key escrow or key backup system. Requests may originate from any type of requester 100, including a web interface, an internal server, or other certificate service system. The request may be made directly to the certificate service system or to a proxy system 130 that acts a certificate request filtering system.

In optional Step 102, a proxy system 130 intercepts the request or receives the request from the requester. The proxy system may be installed in front of the certificate services system. The proxy system may comprise a web service or proxy service. Alternatively, the proxy system may inject into the certificate request flow and capture the requests when sent to the certificate services system. Although the proxy system may modify the certificate request if necessary, the proxy system's primary function is to monitor requests and ensure that the request and resulting certificate actions are correct and properly configured.

The proxy system should be separate from other certificate systems to ensure that changes to the certificate system, including the requesting system and certificate services system, do not accidentally introduce compromise the proxy system's ability to detect certificate problems.

In Step 103, the proxy system (by itself or through a work flow engine 140) selects a verification package 160 that the system will use to verify the request. A workflow engine is a component used to control the proxy system's verification process and control the flow of resulting information. Separating the work flow engine from the proxy service compartmentalizes the function of the separate components, making the system more modular. The work flow engine may select a default verification package that is used to evaluate all certificates or may use a more sophisticated selection process. A sophisticated selection process may include selecting a verification package based on the request's origination (a request sent through a web application uses different checks than a request sent through an API or internal CA system), the information contained in the request, the actions required to fulfil the request, the identity of the customer making the request, or the relevant certificate's attributes. For example, a revoked certificate may require separate checks from a valid certificate. Similarly, a request for a code signing certificate will likely require different checks than a request for issuance of an SSL certificate. Providing dynamic verification packages permits the CA to focus on the risks associated with each type of request.

In Step 104, the work flow engine passes the verification package to a verification controller 150. The verification controller uses the checks in the verification package to verify the request. These checks may include checking the request's origination for authorization and determining whether the requester is authorized to request the certificate action. Other checks may include checking that the corresponding certificate profile is permitted under industry guidelines, verification of the requested key strength and encryption algorithms, and verification that the any required pre-issuance checks are completed. Because the checks are their own separate modules or a database of permitted certificate information, new verification packages and new checks can be added easily to the existing suite/package without impacting existing checks.

In Step 105, the verification results are provided to an authorization decision point (ADP) 170. The ADP is a component that determines the appropriate action to take in response to the verification results. If the verification is successful, the ADP generally permits the request to proceed to the certificate services system where the request is fulfilled. If verification fails, the ADP may determine the appropriate course of action based on the risk associated with the failed checks. Possible actions include denying the action, permitting the request to complete, creating an audit log, sending notice or requiring approval from another system or trusted role, and returning a warning or error to the requester. The ADP may use a notification system 180 to send verification results, including information about the status of individual checks within the verification package, to key stakeholders 220. The notification system ensures that a responsible individual or system is aware of potential risks related to the request.

The system should log all verification packages, checks, tests, authorization decisions, notifications, and other information about the request and verification process (each an audit event 185) in an auditing system 190. The audit log should include information about all actions taken during the process to ensure that system is fully auditable. The audit events are usually stored in a secure database 240 in the auditing system that is accessible to auditors 230. The auditing system provides tracking of the process and auditable proof of proper system operations.

The audit events are stored in a way to ensure they are correctly associated with the certificate request. This allows the auditor to easily review all of the events associated with a request.

If the ADP permits the request to proceed, in Step 106*b*, the certificate services system performs the appropriate action. This action may include generating a new certificate, modifying a certificate, or returning a certificate from a repository.

As shown in FIG. 2, using a similar system permits implementers to verify that certificates are correctly configured and operational. In Step 201, a certificate 200 is returned from the certificate service system 120 back to a requester 100. In Step 202, the proxy system 130 (which could be a separate proxy system from the one verifying the request) interrupts the certificate's transmission or receives the certificate from the certificate services system.

In Step 203, the proxy system initiates a workflow engine to verify the certificate. The workflow engine selects a verification package 160 containing certificate checks based on any combination of the certificate type, request, certificate contents, and certificate system providing the certificate. In Step 204, the workflow engine initiates a verification controller 150 to perform the verification process. Checks on issued certificates may include verifying that the certificate contents match a certificate profile, that the fields, attributes, and extensions for expected values, that all links included in the certificate point to an operational URI, that the request information matches the certificate returned, and that the certificate configuration is correct. Important checks may include verifying the key size, bit settings, extension information, and signing algorithms.

In Step 205, an ADP 170 takes an action based on the results of the verification process. The ADP may choose to deny the certificate (Step 206*a*) from returning to the requester, permit the certificate to proceed (Step 206*b*), notify appropriate stakeholders and systems, log the check results in a database, and/or take another appropriate action.

All information evaluated by the system is stored in an auditing system. The information should be stored in a manner that relates the information so that auditors may easily review the entire certificate request process.

Although the invention envisions that the proxy system will monitor every certificate request, the proxy system may select only a sample of certificates for monitoring to prevent degradation in system speeds. To increase security, the system may include several proxy systems and randomly select which proxy system will evaluate the request and resulting certificate. A different proxy system may be used to evaluate the request and resulting certificate. Using separate servers within the CA's system to host the proxy systems adds a further layer of security as a compromise or error in one proxy service will not result in a failure of the system, permitting continual detection of certificate problems during emergencies and attacks.

What is claimed is:

1. A method for checking a certificate request to verify a certificate's contents comprising:
   receiving a request for a certificate action transmitted to a certificate services system;
   choosing a verification package to determine if there are problems with the certificate's contents;
   actively performing at least one check on the certificate to determine whether the certificate is problematic, including verifying whether the certificate contents comply with requirements in the verification package;
   in response to the results of actively performing at least one check on the certificate, taking an action, including acting as a firewall to ensure the request or certificate is operated in accordance with the verification package, denying the request because of problematic certificate information, and/or notifying stakeholders responsible for evaluating certificate problems;

creating a notification of the result of the content check that is separate from the requested certificate action; and storing the results of the verification in an auditing system that stores the results and provides notification of the verification status to a third-party requester.

2. The method of claim 1, wherein the certificate action requested, before actively performing at least one check and taking an action, is to generate a new certificate.

3. The method of claim 1, wherein choosing the verification package is based on information provided by a requester in the certificate request, and the at least one check is selected from the verification package.

4. The method of claim 1, further comprising passing the verification package to a verification controller to perform the at least one check on the request.

5. The method of claim 1, wherein the action to be taken in response to the verification results of the at least one check is determined based on one or more authorization decision points.

6. The method of claim 5, wherein if the verification is successful, the one or more authorization decision points permit the request to proceed to the certificate services system where the request is fulfilled.

7. The method of claim 5, wherein if the verification fails, the one or more authorization decision points determine the appropriate action to take based on the risk associated with the failed check.

8. The method of claim 1, further comprising notifying a system administrator of a failed certificate verification.

9. The method of claim 1, further comprising providing notification of actions taken during the checking on the certificate's contents.

10. The method of claim 1, wherein performing at least one check comprises checking a certificate key size for the requested certificate.

11. A system for checking a certificate request to verify a certificate's contents comprising:

a proxy system configured to receive a request for a certificate action transmitted to a certificate services system and further configured to choose a verification package to determine if there are problems with a certificate's contents;

a workflow engine configured to actively perform at least one check on the certificate to determine whether the certificate is problematic, including verifying whether the certificate contents comply with requirements in the verification package;

a server configured to, in response to the results of the at least one check performed by the workflow engine, take an action, including acting as a firewall to ensure the request or certificate is operated in accordance with the verification package, denying the request because of problematic certificate information, and/or notifying stakeholders responsible for evaluating certificate problems;

a computer notification system configured to create a notification of the result of the content check that is separate from the requested certificate action; and a computer storage system configured to store the results of the verification and provide notification of the verification status to a third-party requester.

12. The system of claim 11, wherein the certificate action requested, before initiating the workflow engine and server, is to generate a new certificate.

13. The system of claim 11, wherein the verification package is chosen based on information provided by the requester in the certificate request, and the at least one check is selected from the verification package.

14. The system of claim 11, wherein the workflow engine is further configured to pass the verification package to a verification controller in the proxy system to perform the at least one check on the request.

15. The system of claim 11, wherein one or more authorization decision points located on the proxy system determine the action to be taken in response to the verification results of the at least one check.

16. The system of claim 11, wherein if the verification is successful, the one or more authorization decision points permit the request to proceed to the certificate services system where the request is fulfilled.

17. The system of claim 11, wherein if the verification fails, the one or more authorization decision points determine the appropriate action to take based on the risk associated with the failed check.

18. The system of claim 11, further configured to notify a system administrator of a failed certificate verification.

19. The system of claim 11, further comprising an auditing system configured to provide notification of actions taken during the checking on the certificate's contents.

20. The system of claim 11, where performing at least one check comprises checking a certificate key size for the requested certificate.

* * * * *